United States Patent

[11] 3,578,058

[72] Inventor Chester W. Allen
635 N. Flora, Wichita, Kans. 67212
[21] Appl. No. 844,461
[22] Filed July 24, 1969
[45] Patented May 11, 1971

[54] PNEUMATIC TIRE DISMOUNTING APPARATUS
21 Claims, 7 Drawing Figs.

[52] U.S. Cl. .................................................... 157/1.17
[51] Int. Cl. .................................................. B60c 25/06
[50] Field of Search ........................................... 157/1.17, 1.26, 1.28

[56] References Cited
UNITED STATES PATENTS

| | | | |
|---|---|---|---|
| 2,822,863 | 2/1958 | Regnault | 157/1.17 |
| 2,901,029 | 8/1959 | Mraz | 157/1.17 |
| 3,374,819 | 3/1968 | Haynes | 157/1.17 |

Primary Examiner—Cranville Y. Custer, Jr.
Attorney—Robert E. Breidenthal

ABSTRACT: Apparatus for use in dismounting a tire from a wheel comprising an elongated hollow frame having a bifurcated lip at its lower end adapted to be forced between the bead of the tire and the wheel rim. A clamp movably mounted on the frame for movement toward and away from the bifurcated lip to force the latter between the bead and the rim. A foot member slidably mounted in the hollow frame for telescopic downward extension from a retracted position in the frame, with the foot member having a lip portion coextensive with and disposed within the bifurcated lip when the foot member is retracted. Power operable means movable within the frame from an upper to a lower position for initially actuating the clamp toward the bifurcated lips and thence moving the foot member downwardly so that the lip of the latter forces the bead from the rim.

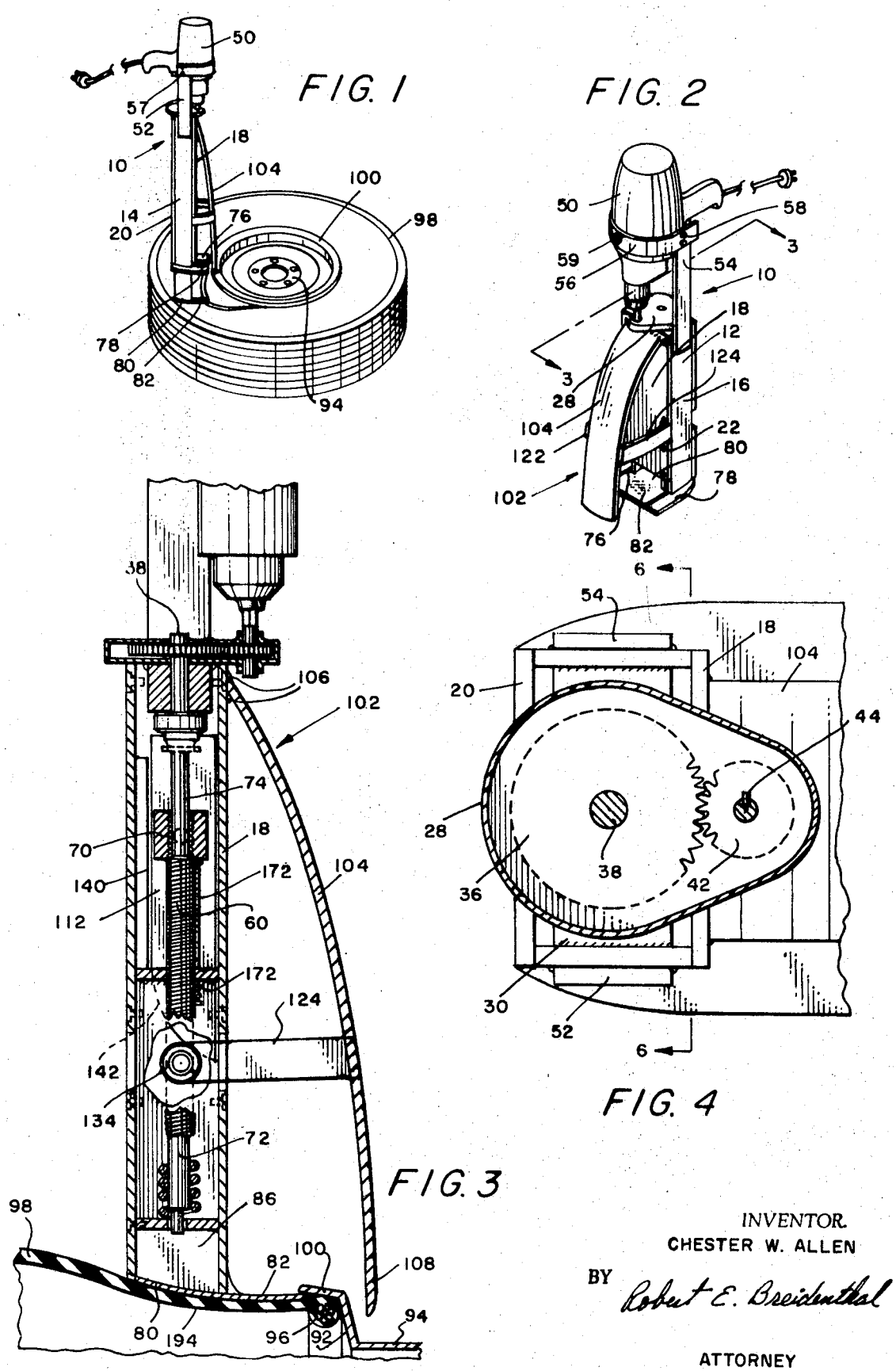

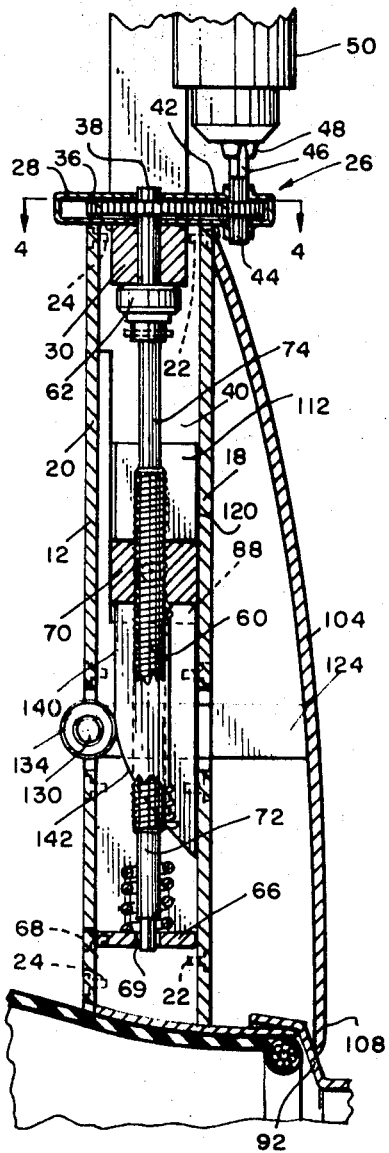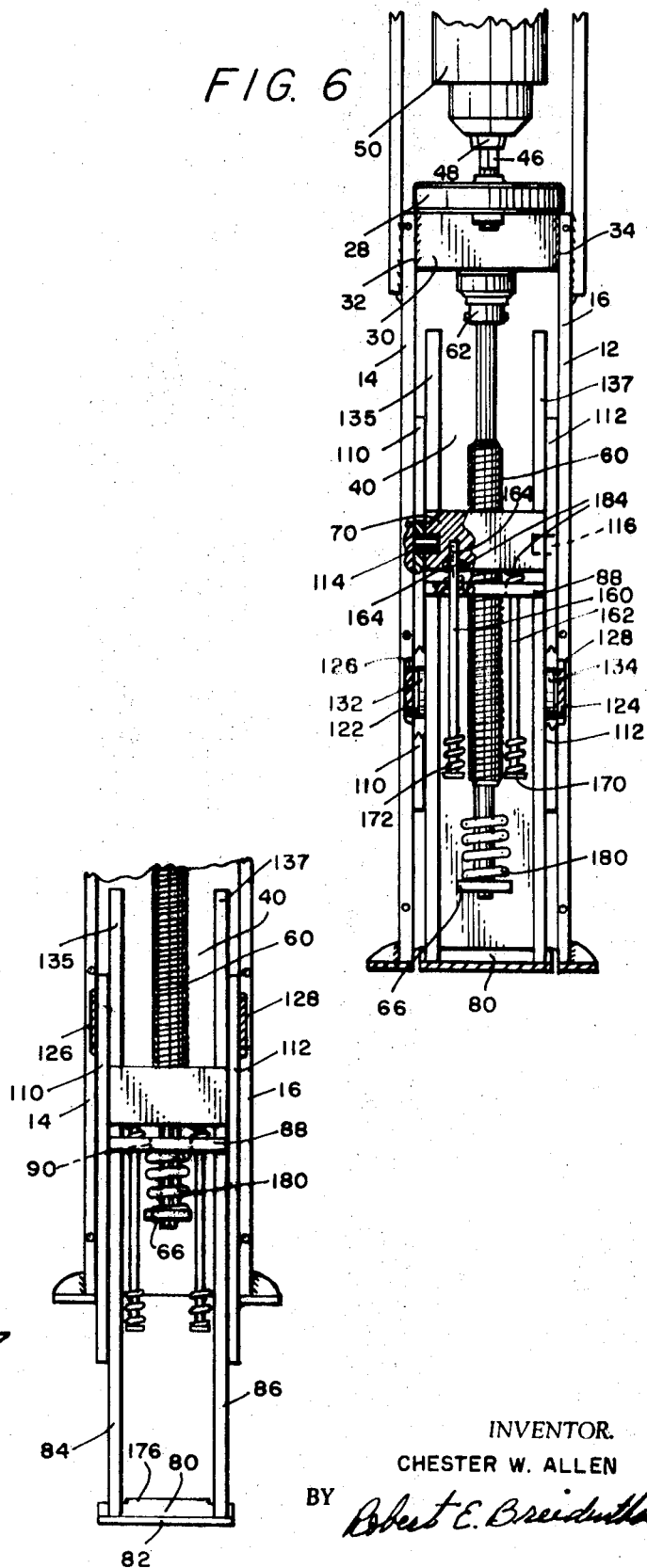

PNEUMATIC TIRE DISMOUNTING APPARATUS

This invention relates to new and useful apparatus for use in the dismounting of a pneumatic tire having a bead from a wheel having a rim, and more particularly pertains to such apparatus wherein the progressive conduct of a single operation will sequentially clamp a wheel in the vicinity of its rim and thereafter force the bead of the tire from the rim while continuing to clamp the wheel.

Many proposals have heretofore been made with respect to apparatus that can be operated to initially clamp the wheel and thereafter operate it to force the bead from the rim; however, such prior art proposals require the sequential operation of two distinct means, namely, the clamping means and then the forcing means, rather than the progressive conduct of a single operation which will sequentially and automatically perform the two desired operations. Such prior art proposals and the comments made with respect thereto are exemplified by the following listed U.S. Letters Pat. Nos.

| | | |
|---|---|---|
| 2,548,033 | Madden | Apr. 10, 1951 |
| 2,581,086 | Edenfield et al. | Jan. 1, 1952 |
| 2,520,330 | Northrup et al. | 29, 1950 |
| 2,775,290 | Mondaro | Dec. 25, 1956 |
| 2,753,923 | Bowyer | July 10, 1956 |

It is an object of the present invention to provide apparatus wherein there is an automatic sequential operation of a wheel clamping means and the operation of means for forcing the tire bead from the tire rim.

Another important object closely allied to the preceding object is to provide apparatus wherein a single actuating means can be moved in a progressive manner in order to sequentially effect the clamping and bead forcing operations.

Yet another object of the invention is to provide apparatus wherein automatic reverse sequencing of operations may be realized in that the withdrawal of the bead forcing means is followed by release of the clamping means from clamping engagement with the wheel.

Still another important object of the invention is to provide apparatus which can be powered by conventional prime mover means and preferably wherein the conventional prime mover means is separable from the other components of the apparatus and which can be detachably coupled to the apparatus for operating the same.

Broadly stated, the invention involves apparatus for use in dismounting a pneumatic tire having a bead from a wheel having a rim comprising an upstanding and elongated frame, said frame having a laterally projecting fixed lip at its lower end adapted to be forced horizontally between the bead and the rim, clamp means engageable with the wheel mounted on the frame actuable to force and maintain the lip between the bead and the rim, a foot member adapted to bear against the tire and means for mounting the same on the frame for vertical movement between an upper retracted position adjacent the fixed lip and a relatively lower extended position, an actuating means mounted on the frame for movement vertically between upper and lower positions and through an intermediate position, a first operator means operatively connecting the actuating means to the clamp means for actuating the latter in response to the actuating means moving downwardly through the intermediate position with the clamp means being maintained in actuated condition when the actuating means is below the intermediate position, and a second operator means operatively connecting the actuator means to the foot member to force the foot member to move downwardly from its retracted position in response to the actuating means moving downwardly from its intermediate position, whereby, during progressive downward movement of the actuating means from its upper position to its lower position, the clamp means is actuated to force and thereafter maintain the fixed lip between the bead and the rim, with the foot member being forced downwardly after actuation of the clamp means.

An important feature of the invention resides in the provision of clamp means wherein the clamp means is resiliently biased to release the same from clamping engagement with a wheel.

Still another important feature of the invention resides in the provision of cam means for forcibly urging the clamp means to clamp and maintain the clamp means in clamping engagement with a wheel.

Yet another important feature of the invention resides in the provision of threaded means for forcing upward and downward movement of the actuating means such that the actuating means is not driven above or below predetermined upper and lower positions of the actuating means, and wherein resilient means are provided for forcing the actuating means in the opposite direction as soon as the direction of forced rotation of the shaft or threaded means is reversed.

These and other objects, aspects and features of the invention will manifest themselves during the ensuing description of a preferred embodiment of the invention, such description to be taken in conjunction with the accompanying drawings illustrative of the preferred embodiment of the invention, wherein:

FIG. 1 is a perspective view of the apparatus taken from one side thereof and showing the same as applied to a wheel and the tire with the bead of the tire having been forced from the wheel rim, and showing the apparatus with a detachable electric prime mover operatively coupled thereto, the power cord of the prime mover being shown broken;

FIG. 2 is a perspective view of the apparatus shown in FIG. 1, this view being taken from the front and side and looking downwardly upon the same;

FIG. 3 is an enlarged vertical sectional view taken upon the plane of the section lines 3-3 in FIG. 2, this view showing the apparatus as applied to a fragmentarily illustrated wheel and tire also shown in section, and the components of the apparatus being shown with the actuating means being disposed in its uppermost position and with portions being broken away to illustrate hidden details of construction;

FIG. 4 is an enlarged sectional detail view taken upon the plane of the section line 4-4 in FIG. 5;

FIG. 5 is a view generally similar to FIG. 3; however, the relative positions of the parts being such that the clamp means has been actuated to clamp the wheel and prior to the forcing of the wheel bead from the wheel rim;

FIG. 6 is a vertical sectional view of the apparatus in the condition shown in FIG. 5, this view being taken upon the plane of the section line 6-6 in FIG. 4; and FIG. 7 is an enlarged vertical sectional detail view generally corresponding to the view of the structure as shown in FIG. 6; however, with the parts being disposed in positions corresponding to the lowermost position of the actuating means.

Referring now to the drawings wherein like parts are designated by like numerals throughout the various views, the reference numeral 10 designates the tire dismounting apparatus generally.

The apparatus 10 is comprised of an elongated frame in the form of a hollow housing 12 comprised of parallelly spaced, vertically extending sidewalls 14 and 16 to which are detachably secured front and rear walls 18 and 20 as by means of sets of machine screws 22 and 24.

A combined gear reduction and bearing assembly 26 is provided which is comprised of a gear housing 28 to the lower side of which is securely attached, as by welding or the like, bearing member 30. The housing 28 is disposed at the top of the housing 12 with the bearing member 30 extending between the sidewalls 14 and 16 and having its opposite ends welded to the sidewalls 14 and 16 as indicated at 32 and 34. An output gear 36 is rotatably disposed in the housing 28 with the shaft 38 thereof being keyed thereto and being rotatably journaled through the housing 28 and the bearing 30, the arrangement being such that the shaft 38 is vertical and extends downwardly from the bearing 30 in alignment with the hollow interior 40 of the housing 12. A pinion gear 42 is rotatably disposed in the gear housing 28 and is in mesh with the relatively larger output gear 36 for driving the latter at a relatively lesser rotational velocity. The pinion gear 42 is keyed to a shaft 44 that is journaled through the housing 28, and the upper end of the shaft 44 extends vertically above the housing 28 and is of polygonal configuration as indicated at 46 whereby the same can be releasably gripped by the customary chuck means 48 of a conventional electric hand drill 50.

The sidewalls 14 and 16 have welded thereto upwardly extending steel straps 52 and 54. A C-shaped clamping strap 56 partially embraces the electric hand drill 50 and the opposite ends of the strap 56 are detachably secured to the upper ends of the upstanding straps 52 and 54 by means of machine screws 58 and 59 in an arrangement such that the electric hand drill 50 can be releasably mounted upon the housing 12 and its straps 52 and 54 in such a position that the chuck 48 can be detachably coupled to the shaft 44 for rotatably driving the latter. The motor 50 is detachably secured in its mounted position by a machine screw 59 that extends through the bight portion of the clamp strap 56 and into a threaded recess in the housing of the motor 50.

The shaft 38 is elongated and extends downwardly in the housing 12 with such portion of the shaft including a threaded section 60. A thrust bearing 62 is pinned to the shaft 38 below the bearing block 30 as shown, whereby substantial loads can be transferred from the shaft 36 to the housing 12 during rotation of the shaft with reduced friction.

The shaft 38 including the threaded portion 60 thereof can be driven to rotate in a forward and a reverse direction by the prime mover 50, as it will be understood that the latter is of the reversible type.

A bearing plate 66 is disposed within the lower portion of the housing 12, such bearing plate 66 having one end secured to the rear wall 20 by means of machine screws 68. The bearing member 66 has a length equal to the spacing of the front and rear walls 18 and 20; however, the width of the same is substantially less than the spacing of the sidewalls 12 and 14 and is spaced from such sidewalls. The lower end of the threaded shaft 60 is journaled in the bearing plate 66 as indicated at 69.

As thus far described, the electric prime mover 50 is detachably mounted upon the housing 12 and is detachably coupled to the shaft 44 of the reduction gearing, whereby the prime mover 50 can be operated to rotate the threaded shaft 60 selectively in a forward or reverse direction. It is deemed well within the skill of those familiar with the art to appreciate that the prime mover can if desired be permanently and rigidly mounted upon the frame 12 and permanently coupled to the reduction gearing 26; however, the illustrated and described structure is preferred in that the electric prime mover 50 can be in the form of an electric hand drill and when dismounted from the remainder of the apparatus 10 can be employed to perform its more usual functions. While the prime mover 50 has been illustrated and described as an electric motor, it is deemed also to be well within the skill and understanding of those familiar with the art that the prime mover 50 can be a conventional air motor of the reversible type, or alternatively, the same can be a reversible hydraulic motor, it only being essential that some means be provided such as to selectively drive the threaded shaft 60 in forward and reverse rotation.

A traveling nut 70 is threadingly mounted upon the threaded shaft 60. The traveling nut 70 is nonrotatable within the housing 12 by means of structure subsequently to be explained, and accordingly, rotation of the shaft 60 in the forward direction will cause the traveling nut (occasionally referred to in the claims as actuating means) 70 to move downwardly, with rotation of the shaft 60 in the reverse direction causing the actuating means 70 to move upwardly. The extent to which the threaded shaft 60 can cause the traveling nut 70 to move downwardly and upwardly is limited by reason of the shaft 38 having a lower end portion 72 and an upper end portion 74 (respectively immediately below and above the threaded portion of the shaft 60) that are unthreaded. The purpose for limiting the extent of upward and downward movement of the traveling nut 70 despite continuing rotation of the threaded shaft 60 will be subsequently explained.

The lower end of the housing 12 is provided with forwardly and laterally extending lip portions 76 and 78, such lip portions 76 and 78 being suitably secured as by welding or the like to the lower ends of the sidewalls 14 and 16, respectively.

A foot member 80 is provided which includes an integral lip 82. The foot member 80 is vertically movable between an upper retracted position such as shown thereof in FIG. 2 and a lower or extended position such as shown thereof in FIG. 1. Means is provided for guiding the foot member 80 and its integral lip 82 in its movement between its retracted and extended positions which comprises a pair of parallelly spaced upstanding plates 84 and 86 attached at their lower ends to the foot member 80 and extending upwardly therefrom into the hollow interior 40 of the housing 12. The plates 84 and 86 are respectively parallel to and spaced from the sidewalls 14 and 16 as best shown in FIGS. 6 and 7. At a position spaced above the foot member 80, the plates 84 and 86 are rigidly connected by a web member 88 that is welded to the plates 84 and 86. The web member 88 has an opening 90 therethrough for freely accommodating a threaded shaft 60 therethrough. Preferably, the opening 90 open rearwardly through the rear edge of the horizontal web 88, whereby assembly of the apparatus 10 is simplified in that the plates 84 and 86 as well as the web 88 can be positioned within the housing 12 from the front thereof after the threaded shaft 60 has been installed simply by removal of the front wall 18.

It should be noted at this time that when the foot member 80 is in its upper and retracted position, the lip 82 integral therewith is disposed between the fixed lip portions 76 and 78 and substantially constitutes an extension therebetween as clearly shown in FIG. 2. As will be presently described, the web member 88 and the plates 84 and 86 constitute operator means responsive to downward movement of the traveling nut or actuating means 70 to force downward movement of the foot member 80 and its integral lip 82.

Clamping means is provided for clamping the apparatus 10 to a portion 92 of the rib structure of a conventional steel vehicle wheel 94 and concurrently forcing entry of all of the lips 76, 78 and 82 (when such lips are disposed as shown in FIG. 2) between the bead 96 of a conventional pneumatic tire 98 and the rim 100 of the wheel 94. Such clamping means are designated generally at 102 and comprise an arcuate steel leaf spring or finger 104 having an upper end fixedly secured as by welding 106 to the upper end of the front wall 18 of the housing 12. As clearly shown in FIGS. 2, 3 and 5, the spring finger 104 extends downwardly and outwardly from the front wall 18 to terminate in a lower end portion 108 that is spaced outwardly from and in general alignment with the direction of the lateral extent of the lips 76, 78 and 82. The spring finger 104 is resilient and quite stiff, and can conveniently be fabricated from a stiff leaf spring such as are conventionally employed in the spring suspension systems of passenger vehicles or trucks. In repose the spring finger 104 has its lower end portion 108 substantially spaced from the outer extremities of the lips 76, 78 and 82, the arrangement being such that the clamp means 102 is biased towards release from clamping the rim portion 92 of the wheel 94 between the lips and the spring finger 104, with means now to be described being provided for forcibly urging resilient flexure of the spring finger 104 to urge the finger portion 108 toward the housing 12 and the lips 76, 78 and 82. The latter mentioned means constitutes an operator means responsive to downward movement of the traveling nut or actuating means 70 to cause clamping of the wheel 94 and such means comprises a pair of elongated cam members 110 and 112 disposed within the housing 12 for vertical sliding movement. The cam member 110 is slidably disposed between the sidewall 14 and the plate 84, and the cam member 112 is similarly slidably disposed between the sidewalls 16 and the plate 86. The cam members 110 and 112 extend above the plates 84 and 86 and are respectively pinned to the traveling nut 70 by pins 114 and 116 as shown in FIG. 6, the arrangement being such that the cam members move vertically along with the traveling nut 70 while preventing rotation of the latter, as best shown in FIGS. 3 and 5, the cam members 110 and 112 (which are mirror images of each other) have forward edges 120 that terminate in close proximity to but with free running clearance with respect to the front wall 18 of the hollow housing 12.

Intermediate its vertical extent, the spring finger 104 is provided with a pair of spaced rearwardly extending arms 122 and 124, such arms being attached to the spring finger 104 by welding or the like. The inner faces of the sidewalls 14 and 16 are provided with recesses or grooves 126 and 128 that extend the entire fore and aft extent of the housing 12, and the arms 122 and 124 movably extend into the housing 12 within such grooves.

The ends of the arms 122 and 124 remote from the spring finger 104 are provided with opposed stub axles such as the stub axle indicated at 130 in FIG. 5 carried by the arm 124. The stub axles 130 have rollers 132 and 134 mounted thereon. The arrangement is such that the roller 132 carried by the arm 122 is normally disposed in the vertical travel path of the cam member 110, while the roller 134 carried by the arm 124 is disposed in the vertical travel path of the cam member 112.

In the preferred construction the front and rear walls 18 and 20 of the housing 12 are notched in the proximity of the grooves 126 and 128 whereby not only the arms 122 and 124, but also the rollers 132 and 134 carried thereby can be passed through the front of the housing 12 but also to at least some extent to the rear thereof as shown in FIG. 5.

The rollers 132 and 134 can be slidably fitted on their respective pins 114, since in the assembled apparatus 10 they are prevented from displacement from such pins by the members 84 and 86 as well as respective integral upward extensions 135 and 137 of the latter that are slidably interposed between the rear side of the nut 70 and the rear wall 20 of the housing 12. The integral extensions 135 and 137 contribute to the guidance of the foot member 80, prevent rotation of the nut 70 and prevent dislodgment of the rollers 132 and 134 when the foot member 80 is extended.

As mentioned previously the cam members 110 and 112 are mirror images of each other, and as shown in FIGS. 3 and 5 in relation to the cam member 112, the forward edge 120 thereof is straight, whereas the upper portion 140 of the rear edge of the cam member 112 is straight and parallel to the edge 120, the lower portion of the rear edge of the cam member 112 is arcuate and curves forwardly and downwardly to merge with the front edge 120 to define an arcuate camming edge or surface 142 for coaction with the roller 134 as will now be described. When the traveling nut 70 is at the upper limit of its travel as shown in FIG. 3, the relationship of the camming surface 142, the roller 134, the arm 124 and the spring finger 104 is as shown in FIG. 3, it being understood that a corresponding relationship exists with respect to the cam member 112, the roller 132 and the arm 122. It will be evident that upon downward movement of the traveling nut 70 from the position shown thereof in FIG. 3 will result in the camming edges 142 of the camming members 110 and 112 bearing against the rollers 132 and 134 and causing rearward movement of such rollers and thereby causing corresponding rearward movement of the arms 122 and 124 with the result that the lower portion 108 of the spring finger 104 is urged toward the rear, whereby the wheel portion 92 can be gripped or clamped by the spring finger 104 as shown in FIG. 5.

As soon as the traveling nut 70 has moved to an intermediate position such as shown in FIG. 5, further downward movement of the nut 70 will not cause further rearward movement of the spring finger 104, but the straight rear edge 140 of the cam members 110 and 112 will maintain the clamp means 102 in the clamping relationship shown in FIG. 5.

When the foot member 80 and its integral lip 82 are in the position shown thereof in FIG. 2, the web 88 is disposed in the position shown thereof in FIG. 5, and since the web 88 is disposed in the travel path of the traveling nut 70, further downward movement of the traveling nut 70 from the position shown thereof in FIG. 5 will result in the foot member 80 and its integral lip 82 being forced downwardly to the position shown thereof in FIGS. 1 and 7. Accordingly, it will be seen that whenever the foot member 80 is forced below the position shown thereof in FIG. 2 by the engagement of the traveling nut 70 with the web 88, the clamp means 102 has been actuated to and is maintained in actuated condition such as to grip a wheel as shown in FIG. 5.

Means is provided for limiting upward movement of the traveling nut 70 relative to the we 88, and an appreciation of such means may be obtained upon inspection of FIG. 6. A pair of rods 160 and 162 depend vertically from the traveling nut 70 and have their upper ends securely threaded into the traveling nut as indicated at 164 with respect to the rod 160. The web 88 is provided with a pair of apertures 164 through which the rods 160 and 162 freely extend. The lower ends of the rods are enlarged as indicated at 170 and coiled compression springs 172 are disposed about the lower end portions of the rods as shown with the springs 172 having their lower ends seated against the lower end enlargements 170 of the rods. The arrangement is such that when the traveling nut 70 is in the position shown thereof in FIG. 3, the foot member 80 is yieldingly urged upwardly by the rods 160 and 162 and the springs 172 to the position shown thereof in FIG. 2 (further upward movement of the foot member 80 being prevented by engagement of a rearwardly extending portion 176 of the foot member 80 engaging under the lower edge of the rear wall 20 of the housing 12), and it is to be noted that such yielding force correspondingly yieldingly urges the nut 70 downwardly with the result that reengagement of the traveling nut 70 with the threads of the shaft 60 will occur immediately upon the shaft 60 being rotated in a forwardly direction.

Since it is also important that reengagement of the traveling nut 70 with the threads of the shaft 60 can be reestablished when the nut 70 is upon the lower unthreaded portion 72 of the shaft 60, there is provided a coiled compression spring 180 about the unthreaded portion 72 of the shaft 60, such coiled compression spring 180 resting upon the bearing plate 66 as clearly shown in FIGS. 5 and 6. Also a pair of coiled compression springs 184 are disposed about the rods 160 and 162 intermediate the traveling nut 70 and the web 88, and the arrangement is such that when the traveling nut 70 is in its lower position, that is, on the unthreaded portion 72 of the shaft 60, the springs 184 are compressed between the nut 70 and the web 88, and in turn the spring 180 is compressed between the web 88 and the bearing member 66 with the result that further downward movement of the nut 70 is yieldingly opposed and the nut 70 is correspondingly yieldingly urged upwardly for reengagement with the threads of the shaft 60 upon the shaft 60 being rotated in a reverse direction.

The operation of the apparatus 10 will be readily understood. With the traveling nut 70 being disposed in its upper position so that the lips 76, 78 and 82 are in the positions shown thereof in FIG. 2 and so that the clamp means 102 is in released condition, the apparatus is positioned relative to the wheel 94 and the tire 98 mounted thereon as shown in FIG. 3, and the prime mover 50 is then operated so as to drive the threaded shaft 60 in the forward direction with the result that the clamp means 102 operates by virtue of the previously described camming action to not only clamp the tire but also to force the lips 76, 78 and 82 between the tire bead 96 and the wheel rim 100. The forward direction of rotation of the shaft 60 is continued after such clamping action has been obtained with the result that the foot member 80 and its integral lip 82 are forced downwardly (while the clamping action is maintained) so that the bead 96 as well as contiguous portions of the sidewall 194 of the tire 98 are forced downwardly from the wheel rim 100, the direction of parallel to the axis of the wheel 94.

After the bead 96 has been forced a sufficient distance from the wheel rim 100 (which may occur prior to the nut 70 traveling to its lowermost position), the direction of rotation imparted to the shaft 60 by the prime mover 50 is reversed with the result that the foot member is returned to the position shown thereof in FIG. 2 and with the result of the clamp means 102 being thereafter released from clamping engagement with the rim portion 92 of the wheel 94.

The apparatus 10 is made of steel and can be fabricated from readily available steel stocks with relatively few special or involved machining and welding operations being involved. It is obvious that the prime mover and the reduction gearing are standard and readily available commercial items. The apparatus 10 can be readily assembled with the assembly of the housing 12 and its contents being concluded with attachment of the front wall 18.

It will be understood by those conversant with the art that the apparatus 10 can be employed with equal facility to the dismounting of pneumatic tires from the wheels of conventional passenger automobiles (whether such tires are tubeless or provided with tubes), and to the dismounting of the very large and heavy type of pneumatic tires employed with truck wheels, such as those having split rims. Furthermore, a unit constructed according to the present invention and of a given size is equally applicable to the dismounting of the smallest passenger vehicle tire to the largest truck or tractor tire that a user may expect to encounter.

I claim:

1. Apparatus for use in dismounting a pneumatic tire having a bead from a wheel having a rim comprising an upstanding and elongated frame, said frame having a laterally projecting fixed lip at its lower end adapted to be forced horizontally between the bead and the rim, clamp means engageable with the wheel mounted on the frame actuable to force and maintain the lip between the bead and the rim, a foot member adapted to bear against the tire and means for mounting the same on the frame for vertical movement between an upper retracted position adjacent the fixed lip and a relatively lower extended position, an actuating means mounted on the frame for movement vertically between upper and lower positions and through an intermediate position, a first operator means operatively connecting the actuating means to the clamp means for actuating the latter in response to the actuating means moving downwardly through the intermediate position with the clamp means being maintained in actuated condition when the actuating means is below the intermediate position, and a second operator means operatively connecting the actuator means to the foot member to force the foot member to move downwardly from its retracted position in response to the actuating means moving downwardly from its intermediate position, whereby, during progressive downward movement of the actuating means from its upper position to its lower position, the clamp means is actuated to force and thereafter maintain the fixed lip between the head and the rim, with the foot member being forced downwardly after actuation of the clamp means.

2. The combination of claim 1, including a movable lip laterally extending from and carried by the foot member for movement therewith, said lips being disposed in side-by-side relationship when the foot member is in its retracted position, and said movable lip being adapted to be forced between the bead and the rim, the arrangement being such that both of said lips can be forced between the bead and the rim on actuation of the clamp means when the foot member is in its retracted position.

3. The combination of claim 2, wherein one of said lips is comprised of two spaced portions with the other of said lips being disposed between said space portions when the foot member is in its retracted position.

4. The combination of claim 2, wherein the fixed lip is comprised of two spaced portions with the movable lip being disposed therebetween when the foot member is in its retracted position.

5. The combination of claim 1, wherein the clamp means comprises a downwardly extending clamp finger and means at a location above the fixed lip for mounting the finger on the frame for lateral movement of the lower end of the finger towards and away from the fixed lip, and said first operator means including a cam member.

6. The combination of claim 1, wherein the clamp means comprises a downwardly extending clamp finger and means at a location above the fixed lip for mounting the finger on the frame for lateral movement of the lower end of the finger towards and away from the fixed lip, an said first operator means including a cam member, said means for mounting the finger including spring yieldingly urging the finger from the fixed lip.

7. The combination of claim 1, wherein the clamp means comprises an elongated spring finger having an upper end secured to the frame at a location spaced above the fixed lip and having a lower end spaced laterally from the frame and the laterally extending fixed lip when the spring finger is in repose, said first operating means comprising coacting cam means carried by the actuating means and the spring finger operative on downward movement of the actuating means for urging movement of the lower end of the spring finger against the resilient bias thereof and toward the fixed lip.

8. The combination of claim 7, wherein the second operator means includes an element movable with the foot member that is disposed in the travel path of the actuating means, with such element being vertically spaced below the actuating means when the latter is in its upper position and the foot member is in its retracted position.

9. The combination of claim 1, wherein the second operator means includes an element movable with the foot member that is disposed in the travel path of the actuating means, with such element being vertically spaced below the actuating means when the latter is in its upper position and the foot member is in its retracted position.

10. The combination of claim 9, including power means for moving the actuating means.

11. The combination of claim 9, wherein the actuating means comprises a traveling nut threadingly mounted on a rotatably mounted, vertically extending threaded shaft.

12. The combination of claim 9, wherein the actuating means comprises a traveling nut threadingly mounted on a rotatably mounted, vertically extending threaded shaft, and power means for rotating the shaft.

13. The combination of claim 12, wherein said power means comprises a prime mover, and means for detachably coupling the prime mover to the shaft.

14. The combination of claim 12, wherein said power means comprises an electric motor, and means for detachably coupling the electric motor to the shaft.

15. The combination of claim 1, wherein said frame is an elongated and vertical hollow housing having a front side facing the direction toward which the fixed lip laterally extends, said actuating means being disposed within and vertically movable within the housing, said second operator means including an element secured to the foot member for movement therewith and disposed within the hollow housing and in the travel path of the actuating means, said element being spaced below actuating means when the latter is in its upper position, said clamp means comprising a spring finger having an upper end fixed to the front side of the housing and its lower end spaced from and movable toward and away from the fixed lip, said first operator means comprising coating cam means carried by the actuating means and the spring finger, said cam means including a camming member within the housing and mounted on the actuating means for vertical movement therewith and an arm fixed to the spring finger and movably extending into the housing for operative engagement with the camming member.

16. The combination of claim 15, wherein a movable and laterally extending lip is mounted on the foot member for movement therewith, said movable lip being disposed adjacent the fixed lip and adapted to be forced between the bead and the fixed lip and adapted to be forced between the bead and the rim when the foot member is in its retracted position.

17. The combination of claim 16, wherein one of said lips is comprised of two spaced portions with the other lip being disposed therebetween when the foot member is in its retracted position.

18. The combination of claim 15, including power means for moving the actuating means.

19. The combination of claim 16, wherein the actuating means is a traveling nut threadingly mounted on a vertically extending, rotatably mounted threaded shaft disposed within the housing, and power means for rotating the threaded shaft.

20. The combination of claim 19, wherein the shaft has upper and lower unthreaded portions corresponding to upper and lower positions occupied by the traveling nut when the actuating means is respectively in its upper and lower positions, and means for yieldingly urging the traveling nut upwardly when it is in its lower position.

21. The combination of claim 19, wherein the shaft has upper and lower unthreaded portions corresponding to upper and lower positions occupied by the traveling nut when the actuating means is respectively in its upper and lower positions, and means for yieldingly urging the traveling nut downwardly when it is in its upper position.